Patented Apr. 30, 1929.

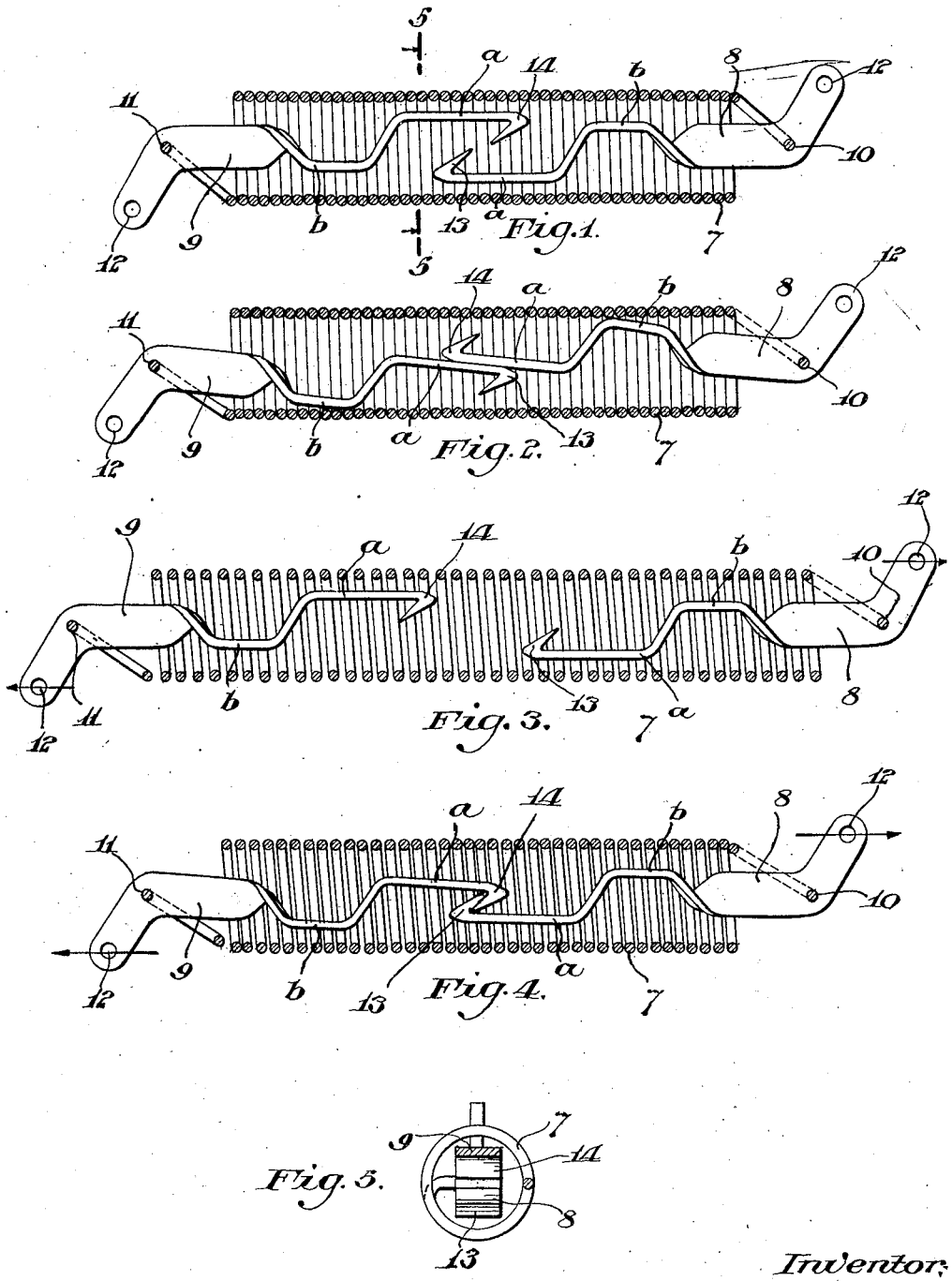

1,711,300

UNITED STATES PATENT OFFICE.

RALPH B. ZIEGLER, OF PHILADELPHIA, PENNSYLVANIA.

CONNECTER.

Application filed April 18, 1928. Serial No. 271,085.

My invention relates to improvements in connecters. The object is to provide improved means for connecting a strand, chain, rope or the like to another or to the same strand, chain, rope, or the like, or to any other object at any required point.

The invention comprises a resilient element, and a pair of disengageable connecting and locking elements associated therewith, whereby the resilient element may be arbitarily stretched, with the locking elements in separated position, for the purpose of bringing the device into desired relationship with objects to be connected and whereby, upon release of tension, the resilient element will contract to bring the locking elements into cooperating locking relationship.

The device is especially applicable as a connecter for tire chains, but is also equally applicable as a connecter for other objects.

The device will for convenience be described as applied to tire chains.

Referring to the drawings, which illustrate merely by way of example, a suitable embodiment of the invention:—

Fig. 1 is an elevation in part section of the device in contracted position with the locking elements in position ready for locking engagement.

Fig. 2 is a similar view with parts in preliminary position for adjusting the chain.

Fig. 3 is a similar view with parts in expanded position.

Fig. 4 is a similar view showing ends of locking elements in final engagement.

Fig. 5 is a cross-section on line 5, 5 of Fig. 1.

Similar numerals refer to similar parts throughout the several views.

In the device as illustrated in the drawings, the spring 7 is of helical formation. To the ends of the spring are pivotally secured the locking elements 8 and 9, as at 10 and 11, at a substantial distance from the outer ends of said elements 8 and 9. Said outer ends are provided with means, such as holes 12, for securing the links or hooks of chains or other devices; obviously hooks could be substituted for the holes 12.

At the other ends of said elements 8 and 9 are provided hook formations 13 and 14, so shaped as to slide one past the other, upon the contraction of the spring, as shown in Fig. 1. These hooks are adapted to cooperate in locking engagement upon the expanding movement of the spring as indicated in Fig. 4.

It will be noted that normally, after the parts assume the relative positions shown in Fig. 1, any force exerted on the spring 7, tending to stretch or expand the same, is in the nature of a pull or tension on the outer ends of the elements 8 and 9.

It will be noted that these elements 8 and 9 are pivotally connected or supported to the spring ends at the points 10 and 11, which thus become the fulcrums of the lever elements 8 and 9. It will now be seen that a pull on the outer ends of one or both of the levers, in the directions of the arrows, will cause a slight rotation of said lever or levers on its axis to move the hook formations 13 and 14 toward each other into locking engagement, and that a continuance of such pull or tension maintains said hooks in locking engagement.

In the specific application herein described, by way of example, the outer ends of elements 8 and 9 are adapted to be connected to the links not shown of tire chains by means of the holes 12.

An intermediate portion of the chain is laid flat upon the ground and the wheel rolled into position upon this portion. The chain is then lifted up around the tire, one side margin of the chain will easily assume approximately normal position.

The other side will have to pass around the outer periphery of the tire which is only possible by stretching. This is accomplished by the connecter hereindescribed.

As a convenient method of operation the spring is slightly stretched while holding the hooks 13 and 14 separated which is easily accomplished by manual pressure on the outer ends of elements 8 and 9. The pressure on said outer ends is then reversed and the spring allowed to contract with the hook elements back to back as shown in Fig. 2. It is now only necessary to push the connecter over the periphery of the tire; the hooks being ineffective to prevent the required stretching of the spring. After so passing over the tire periphery, the spring immediately contracts as far as possible thus holding the chain in place. It may be that the chain does not become evenly distributed until the wheel begins to move. As soon as it does become evenly distributed, the spring will contract sufficiently to bring the hooks into locking position as shown either in Fig. 1 or 4, after which a straight pull on the elements 8 and 9, in opposite directions as indicated by the arrows, will only make the locking engagement between said elements more secure.

When it is desired to remove the chain, the disengagement of the hooks may always be accomplished by the proper manual pressure on the outer ends of the elements 8 and 9.

It will be noted that the portions or extensions $a$ of elements 8 and 9, adjacent the hooks 13 and 14, are so shaped as to engage the inner surface of the spring formation to limit the separating movement of the hooks 13 and 14, so that the greatest opening or separating movement permitted is only sufficient to permit the point of one hook passing the point of the other hook in the contracting movement of the spring, and therefore the slightest force exerted on the outer ends of 8 and 9 in direction of the arrows assures locking engagement of the hooks. The intermediate portions $b$ are oppositely bent adapted to engage the opposite interior wall of the spring formation to limit the approach of the hooks 13 and 14 to said walls.

The transverse extensions of the hooks 13 and 14 have dimensions preferably as great as the interior space of the spring will permit.

The device therefore is very strong of extreme simplicity, easy to manipulate and practically free from accidental disengagement.

What I claim is:—

1. A connecter for a strand under tension, comprising a helical spring, cooperating elements extending into the spring from opposite ends thereof, said elements having their adjacent ends provided with cooperating hook formations, each element connected to a spring end, one element having a rocking movement on a fulcrum provided by the spring connection, with respect to the other element, so that the cooperating hook formations may be moved into and out of engagement with each other, each element having a part beyond the spring end for connection to a strand, the connections of an element with the spring and with a strand being such that a straight line passing through the points of spring and strand connection shall be at a substantial angle with the longitudinal line of the element, so that the pull of the strand on the element will move its hook formation into engaging position with respect to the cooperating hook formation.

2. A connecter for a strand under tension, comprising a helical spring, cooperating elements extending into the spring from opposite ends thereof, said elements having their adjacent ends provided with cooperating hook formations, each element connected to a spring end, one element having a rocking movement on a fulcrum provided by the spring connection, with respect to the other element, so that the cooperating hook formations may be moved into and out of engagement with each other, each element having a part beyond the spring end for connection to a strand, the connections of an element with the spring and with a strand being such that a straight line passing through the points of spring and strand connection shall be at a substantial angle with the longitudinal line of the element, so that the pull of the strand on the element will move its hook formation into engaging position with respect to the cooperating hook formation and the increase of said tension will increase the efficiency of hook engagement.

3. A connecter for a strand under tension, comprising a helical spring, cooperating elements extending into the spring from opposite ends thereof, said elements having their adjacent ends provided with cooperating hook formations, each element connected to a spring end, one element having a rocking movement on a fulcrum provided by the spring connection, with respect to the other element, so that the cooperating hook formations may be moved into and out of engagement with each other, each element having a part beyond the spring end for connection to a strand, the connections of an element with the spring and with a strand being such that a straight line passing through the points of spring and strand connection shall be at a substantial angle with the longitudinal line of the element, so that the pull of the strand on the element will move its hook formation into engaging position with respect to the cooperating hook formation, the projecting end of one element also providing means whereby the elements may be manipulated to cause the hooks to pass each other in order to permit the arbitrary stretching of the spring.

4. A connecter for a strand under tension, comprising a helical spring, cooperating elements extending into the spring from opposite ends thereof, said elements having their adjacent ends provided with cooperating hook formations, each element connected to a spring end, one element having a rocking movement on a fulcrum provided by the spring connection, with respect to the other element, so that the cooperating hook formations may be moved into and out of engagement with each other, each element having a part beyond the spring end for connection to a strand, the connections of an element with the spring and with a strand being such that a straight line passing through the points of spring and strand connection shall be at a substantial angle with the longitudinal line of the element, so that the pull of the strand on the element will move its hook formation into engaging position with respect to the cooperating hook formation, the said elements being so proportioned and connected with respect to the spring, that their ends having the hook formation will overlap when the spring is contracted to its normal position of rest, and so that the hook formations will come into cooperative engagement when the spring is stretched from said position of rest.

RALPH B. ZIEGLER.